(12) United States Patent
Rolston et al.

(10) Patent No.: US 6,717,054 B2
(45) Date of Patent: Apr. 6, 2004

(54) BUS BAR WITH FREQUENCY-FILTERING GEOMETRY

(75) Inventors: David Rolston, Quebec (CA); Miguel Conde, Seal Beach, CA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/160,951

(22) Filed: May 30, 2002

(65) Prior Publication Data

US 2002/0185298 A1 Dec. 12, 2002

(30) Foreign Application Priority Data

Jun. 12, 2001 (CA) .............................................. 2350191

(51) Int. Cl.[7] ................................................. H01B 7/08
(52) U.S. Cl. ............................... 174/72 B; 174/117 FF; 363/144
(58) Field of Search ..................... 174/72 B, 117 FF; 363/144

(56) References Cited

U.S. PATENT DOCUMENTS

| | | | | |
|---|---|---|---|---|
| 3,448,355 A | * | 6/1969 | Ahearn, Jr. et al. | 174/72 B |
| 3,520,987 A | * | 7/1970 | Ohlrich | 174/72 B |
| 3,586,757 A | * | 6/1971 | Haldeman, Jr. | 174/117 FF |
| 3,612,744 A | * | 10/1971 | Thomas | 174/36 |
| 3,818,119 A | * | 6/1974 | Sutherland et al. | 174/72 B |
| 3,893,233 A | * | 7/1975 | Glover | 29/838 |
| 4,236,038 A | * | 11/1980 | Taylor | 174/72 B |
| 4,346,257 A | * | 8/1982 | Moss et al. | 174/72 B |
| 4,430,522 A | * | 2/1984 | Bader | 174/72 B |
| 4,599,486 A | * | 7/1986 | Herrandez | 174/72 B |
| 4,926,007 A | * | 5/1990 | Aufderheide et al. | 174/36 |
| 4,942,373 A | * | 7/1990 | Ozawa et al. | 333/161 |
| 5,051,542 A | * | 9/1991 | Hernandez | 174/72 B |
| 5,365,424 A | * | 11/1994 | Deam et al. | 363/144 |
| 6,162,993 A | * | 12/2000 | Barthelt | 174/117 F |
| 6,339,192 B1 | * | 1/2002 | Hashimoto | 174/72 B |

* cited by examiner

*Primary Examiner*—Dean A. Reichard
*Assistant Examiner*—Adolfo Nino
(74) *Attorney, Agent, or Firm*—Harringotn & Smith, LLP

(57) ABSTRACT

The present invention relates to a laminated conductor assembly comprising an input section, an output section, and a superposition of alternate electrically conducting and electrically insulating layers. The electrically conducting layers present a geometry which defines both capacitive and inductive structures, and these capacitive and inductive structures form, between the input and output sections, a capacitive and inductive frequency-filtering circuit. The electrically conducting layers comprise respective superposed first end portions for defining first capacitive structures, respective superposed second end portions opposite to the first end portions for defining second capacitive structures, and respective narrower bridge portions for interconnecting the first and second end portions of the corresponding electrically conducting layers, wherein these narrower bridge portions define respective inductive structures. Preferably, the narrower bridge portions are laterally offset with respect to each other. The laminated conductor assembly can be a laminated direct current bus bar.

17 Claims, 4 Drawing Sheets

FIG. 7

BUS BAR WITH FREQUENCY-FILTERING GEOMETRY

BACKGROUND OF THE INVENTION

1. Field of the Invention

The present invention relates to a bus bar having a geometry designed for filtering desired signal frequencies.

2. Brief Description of the Prior Art

The prior art has already proposed bus bars configured to create a high capacitive region of low impedance for filtering high frequency noise and attenuate voltage transients. For that purpose, a region of high static capacitance is formed by inserting a high dielectric material in the form of wafers, chips or disks between two electrically conducting plates. For example:

- U.S. Pat. No. 4,436,953 granted to Gottlieb on Mar. 13, 1984 describes miniature bus bar assemblies which incorporate discrete capacitive elements having a high dielectric constant. These capacitive elements are preferably metallized ceramic wafers bonded between a pair of bus bar conductors.
- U.S. Pat. No. 4,440,972 (Taylor) issued on Apr. 3, 1984 proposes miniature bus bars in which capacitor ribbons with discrete capacitive elements are retained within the insulating layer. These capacitor ribbons are mounted between a pair of bus bar conductor plates with the capacitive elements placed in electrical contact with the plates.
- U.S. Pat. No. 4,584,768 granted to Tosti on Apr. 29, 1986 relates to a method for manufacturing a highly capacitive multilayer conductive bar. Again, ceramic chips are used to improve the capacitance. These chips are placed within the layers of the conductive bar.
- U.S. Pat. No. 5,185,690 (Hernandez) issued on Sep. 24, 1991 discloses a bus bar including conductive layers and a high capacitance flexible dielectric sheet material between these conductive layers. The high capacitance dielectric sheet comprises high dielectric chips or pellets of relatively small area and thickness arranged in a planar array. These high dielectric constant chips are spaced apart by a small distance.
- U.S. Pat. No. 5,365,424 granted to Deam et al., on Nov. 15, 1994 suggests the use of a low impedance (high capacitance) bus structure involving a laminated plate assembly. This patent mentions that the inductive impedance substantially attenuates the high frequency response of a bus.

The above prior art references present no high frequency model for any structure, and the performance of these structures is likely to be very irregular from the frequency response and filtering points of view. Also, these structures will not enable the construction of a bus bar capable of producing desired frequency attenuation for high frequency signals while conducting DC signal without attenuation.

Also, low pass filters are currently used in electrical circuits to suppress noise. In high impedance and high frequency circuits, pi-network filters are widely used. A pi-network includes two shunt capacitors and an inductor connected in series between the two capacitors. U.S. Pat. No. 4,853,659 granted to Kling on Aug. 1, 1989 describes a planar pi-network filter assembly. This filter assembly comprises capacitive structures formed on opposing surfaces of a planar inductive member. Each capacitive structure comprises a ground electrode section, a dielectric layer and a signal electrode. Preferably, the inductive member is made of ferrite material. The combination forms a capacitor-inductor-capacitor pi-network.

OBJECT OF THE INVENTION

An object of the present invention is to provide a laminated conductor assembly presenting a desired frequency-filtering feature obtained by manipulating the geometry of the conductor(s).

SUMMARY OF THE INVENTION

More specifically, in accordance with the present invention, there is provided a laminated conductor assembly comprising an input section, an output section, and a superposition of alternate electrically conducting and electrically insulating layers. The electrically conducting layers present a geometry which defines both capacitive and inductive structures, and these capacitive and inductive structures form, between the input and output sections, a capacitive and inductive frequency-filtering circuit.

In accordance with a preferred embodiment of the laminated conductor assembly, the electrically conducting layers comprise respective, superposed first end portions for defining first capacitive structures, respective, superposed second end portions opposite to the first end portions for defining second capacitive structures, and respective narrower bridge portions for interconnecting the first and second end portions of the corresponding electrically conducting layers and for defining respective inductive structures. Advantageously, at least a part of the narrower bridge portions are laterally offset with respect to each other.

The present invention further relates to a laminated direct current bus bar, comprising an input section, an output section, and a superposition of alternate electrically conducting plates and electrically insulating films. This superposition comprises a first electrically conducting ground plate, an electrically conducting positive plate, an electrically conducting negative plate, a second electrically conducting ground plate, a first electrically insulating film interposed between the first ground plate and the positive plate, a second electrically insulating film interposed between the positive plate and the negative plate, and a third electrically insulating film interposed between the negative plate and the second ground plate. The first ground plate, the positive plate, the negative plate and the second ground plate have a geometry which defines both capacitive and inductive structures, and these capacitive and inductive structures form, between the input and output sections, a capacitive and inductive frequency-filtering circuit.

According to a preferred embodiment of the laminated bus bar, the first ground plate, the positive plate, the negative plate and the second ground plate comprise respective, superposed first end portions for defining first capacitive structures, respective, superposed second end portions opposite to the first end portions for defining second capacitive structures, and respective narrower bridge portions for interconnecting the first and second end portions of the corresponding plates, these narrower bridge portions defining respective inductive structures.

Preferably, the narrower bridge portions of the positive and negative plates are laterally offset with respect to each other and with respect to the narrower bridge portions of the first and second ground plates.

According to another preferred embodiment:

the input section comprises a tab of the first end portion of the positive plate and a tab of the first end portion of the negative plate;

the output section comprises a tab of the second end portion of the positive plate and a tab of the second end portion of the negative plate;

the first ground plate, the positive plate, the negative plate and the second ground plate have respective first and second ends;

the tab of the first end portion of the positive plate is a laterally extending tab situated at the first end of the positive plate;

the tab of the first end portion of the negative plate is a laterally extending tab situated at the first end of the negative plate;

the tab of the second end portion of the positive plate is a laterally extending tab situated at the second end of the positive plate; and the tab of the second end portion of the negative plate is a laterally extending tab situated at the second end of the negative plate.

In accordance with a further preferred embodiment of the laminated bus bar, the first and second ground plates are electrically interconnected, the first end portion of the positive plate and the first end portion of the first ground plate define with the first film a first shunt capacitor structure, the first end portion of the positive plate and the first end portion of the negative plate define with the second film a second shunt capacitor structure, the first end portion of the negative plate and the first end portion of the second ground plate define with the third film a third shunt capacitor structure, the narrower bridge portion of the positive plate forms a first inductor structure, the narrower bridge portion of the negative plate forms a second inductor structure, the narrower bridge portions of the first and second ground plates form a third inductor structure, the second end portion of the positive plate and the second end portion of the first ground plate define with the first film a fourth shunt capacitor structure, the second end portion of the positive plate and the second end portion of the negative plate define with the second film a fifth shunt capacitor structure, and the second end portion of the negative plate and the second end portion of the second ground plate define with the third film a sixth shunt capacitor structure.

In accordance with a further preferred embodiment of the laminated bus bar, the first and second ground plates both have first and second ends and are longer than the positive and negative plates and the first, second and third films, the first ends of the first and second ground plates are interconnected and the second ends of the first and second ground plates are interconnected.

The foregoing and other objects, advantages and features of the present invention will become more apparent upon reading of the following non restrictive description of a preferred embodiment thereof, given for the purpose of illustration only with reference to the accompanying drawings.

DETAILED DESCRIPTION OF THE PREFERRED EMBODIMENT

In the different figures of the appended drawings, the corresponding elements are identified by the same references.

Figure 2:
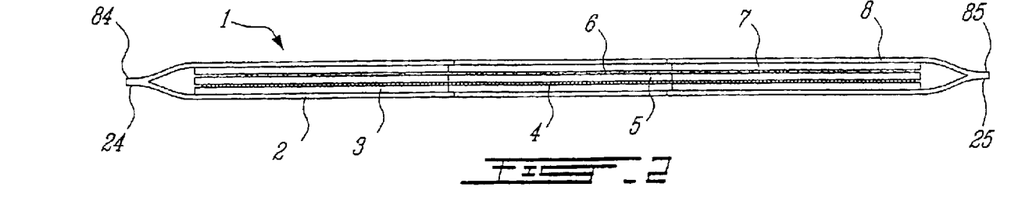
FIG. 2 is a side elevation view of the bus bar of FIG. 1.

Referring to FIG. 2 of the appended drawings, the preferred embodiment of the bus bar 1 according to the invention consists of laminated sheets of electrically conducting metal and films of electrically insulating material.

More specifically, the bus bar 1 comprises:

- a generally rectangular lower ground plate 2 made of electrically conducting metal;
- a first, generally rectangular film 3 made of electrically insulating material applied to the top face of the lower ground plate 2;
- a generally rectangular positive plate 4 made of electrically conducting metal applied to the top face of the first film 3;
- a second, generally rectangular film 5 made of electrically insulating material applied to the top face of the positive plate 4;
- a generally rectangular negative plate 6 made of electrically conducting metal applied to the top face of the second film 5;
- a third, generally rectangular film 7 made of electrically insulating material applied to the top face of the negative plate 6; and
- a generally rectangular upper ground plate 8 made of electrically conducting metal applied to the top face of the third film 7.

Examples of electrically conducting metal are copper, aluminium, etc. Metal can also be replaced by another type of electrically conducting material suitable to fabricate the plates 2, 4, 6 and 8. Examples of electrically insulating material are the dielectric materials currently used in electrical insulation applications including, as a non limitative example, plastics. Of course, it is within the scope of the present invention to use any suitable electrically conducting and insulating materials.

Figure 4:
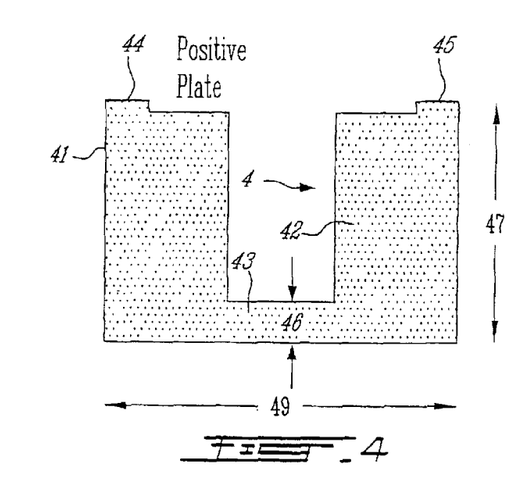
FIG. 4 is a top plan view of a positive plate of the bus bar of FIGS. 1 and 2.

Referring to FIG. 4, the positive plate 4 is made of a single piece of electrically conducting sheet metal. More specifically, positive plate 4 comprises a first, generally rectangular and full-width end portion 41 and a second, generally rectangular and full-width end portion 42 interconnected through a narrower bridge 43 cut in the plate 4. Bridge 43 has a width 46 which is small in comparison to the width 47 of the end portions 41 and 42. Also, bridge 43 is located on one side of the positive plate 4. On the side of the positive plate 4 opposite to the bridge 43, end portion 41 comprises a positive tab input 44, while end portion 42 comprises a positive tab output 45. As illustrated in FIG. 4, tab input 44 and tab output 45 are laterally extending tabs situated at the respective opposite ends of the positive plate 4. Of course, the tab input 44 and output 45 can be replaced by any other suitable structure such as a bolt-and-nut assembly, a slot assembly, etc. for connecting the full-width end portions 41 and 42 to respective electrical conductors.

Figure 5:
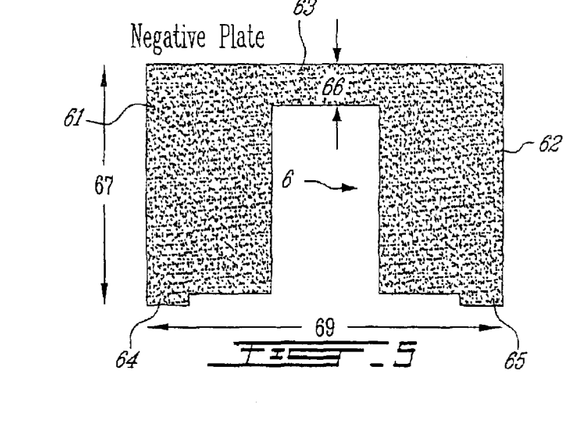
FIG. 5 is a top plan view of a negative plate of the bus bar of FIGS. 1 and 2.

Referring to FIG. 5, the negative plate 6 is made of a single piece of electrically conducting sheet metal. More specifically, negative plate 6 comprises a first, generally rectangular and full-width end portion 61 and a second, generally rectangular and full-width end portion 62 interconnected through a narrower bridge 63 cut in the plate 6. Bridge 63 has a width 66 which is small in comparison to the width 67 of the end portions 61 and 62. Also, bridge 63 is located on one side of the negative plate 6 opposite to the bridge 43 of positive plate 4 but on the same side as the positive tab input 44 and output 45. On the side of the negative plate 6 opposite to the bridge 63 and to the positive tab input 44 and output 45 but on the same side as the bridge 43, end portion 61 comprises a negative tab input 64, while end portion 62 comprises a negative tab output 65. As illustrated in FIG. 5, the negative tab input 64 and output 65 are laterally extending tabs situated at the respective opposite ends of the negative plate 6. Of course, the tab input 64 and ouput 65 can be replaced by any other suitable structure such as a bolt-and-nut assembly, a slot assembly, etc. for connecting the full-width end portions 61 and 62 to respective electrical conductors.

Just a word to mention that the positions of the tab input 44 and output 45, and the tab input 64 and output 65 are somewhat arbitrary as long as the tab input 44 and output 45 are located on opposite sides of the bridge 43 and the tab input 64 and output 65 are located on opposite sides of the bridge 63.

Figure 3:
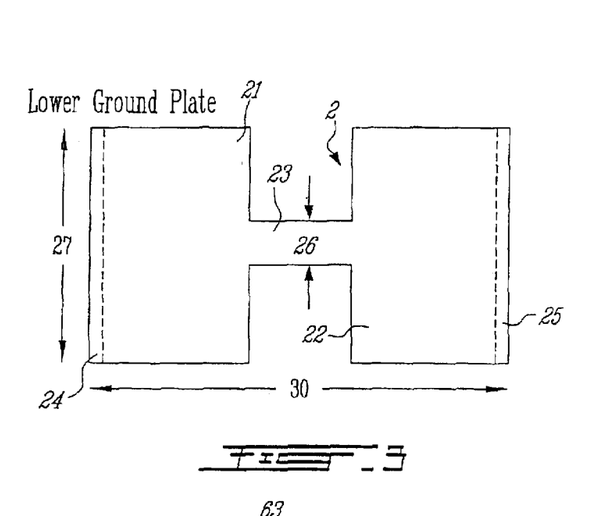
FIG. 3 is a top plan view of a lower ground plate of the bus bar of FIGS. 1 and 2.
Figure 6:
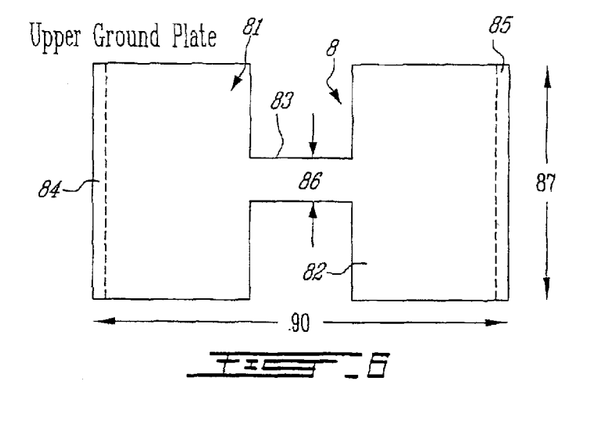
FIG. 6 is a top plan view of an upper ground plate of the bus bar of FIGS. 1 and 2.

The lower 2 (FIG. 3) and upper 8 (FIG. 6) ground plates are identical and will be described concurrently with reference to FIGS. 3 and 6 of the appended drawings. Ground plate 2,8 is made of a single piece of electrically conducting sheet metal. More specifically, plate 2, 8 comprises a first, generally rectangular and full-width end portion 21, 81 and a second, generally rectangular and full-width end portion 22, 82 interconnected through a central, longitudinal narrower bridge 23, 83 cut in the plate 2, 8. Bridge 23, 83 has a width 26, 86 which is small in comparison to the width 27, 87 of the end portions 21, 81 and 22, 82.

The bridges 23, 83, the bridge 43 and the bridge 63 must be sufficiently laterally spaced apart from each other to reduce coupling therebetween. Also, the bridges 23, 43, 63 and 83 must be kept away from conductive surfaces; for example, the inductance value of the bridges will reduce if the bus-bar is brought in close proximity to a large piece, such as a sheet, of metal.

To laminate the lower ground plate 2, the electrically insulating film 3, the positive plate 4, the electrically insulating film 5, the negative plate 6, the electrically insulating film 7 and the upper ground plate 8, a heat-sensitive adhesive material is incorporated in electrically insulating material of the films 3, 5 and 7. Accordingly, the superposed plate 2, film 3, plate 4, film 5, plate 6, film 7 and plate 8 are pressed and heated to adhere the film 3 to both plates 2 and 4, the film 5 to both plates 4 and 6, and the film 7 to both plates 6 and 8. This type of lamination is well known and widely used in the field of busbars. Of course, the present invention is in no manner limited to such lamination process; any other suitable method for mechanically assembling the stack of plates and films can eventually be used.

As illustrated in FIGS. 1, 2, 3 and 6, the length 30, 90 of the ground plate 2,8 may be greater than the length 49 of positive voltage plate 4, the length 69 of negative voltage plate 6 and the length of the electrically insulating films 3, 5 and 7. In this manner, to obtain a better frequency-filtering response, the end 24 of ground plate 2 and the end 84 of ground plate 8 can be electrically and mechanically connected to each other, for example folded on each other. For the same purpose, the end 25 of ground plate 2 and the end 85 of ground plate 8 can be electrically and mechanically connected to each other, for example folded on each other. Although this is not shown in the appended drawings, a still better frequency-filtering response can be obtained by electrically and mechanically connecting the lower 2 and upper 8 ground plates along the four edges thereof, that is over the entire periphery thereof. Of course, it is within the scope of the present invention to use any method other than folding to electrically and mechanically connect the periphery of the lower ground plate 2 to the periphery of the upper ground plate 8.

Figure 8:
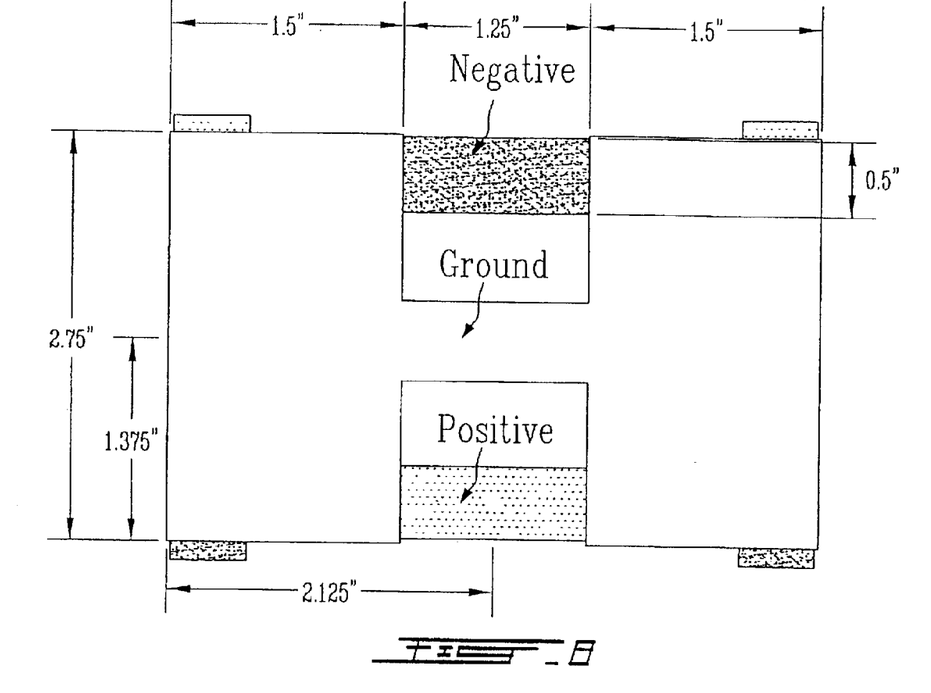
FIG. 8 is a top plan view similar to the top plan view of FIG. 1, showing dimensions of an example of bus bar according to the present invention.
Figure 9:
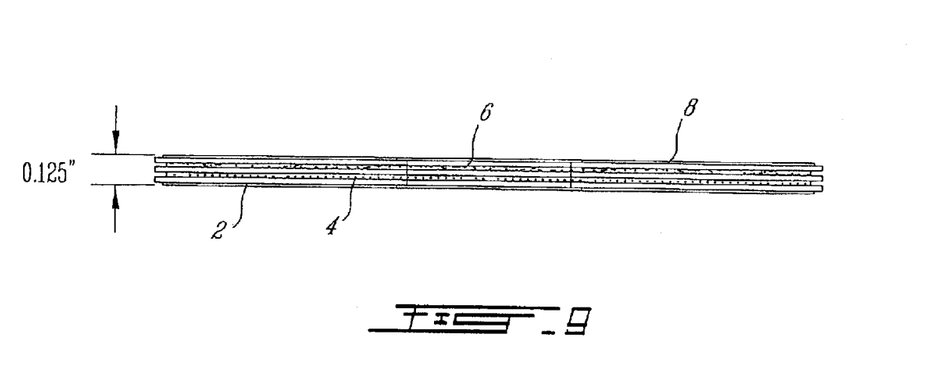
FIG. 9 is a side elevation view similar to the side elevation view of FIG. 2, showing a thickness dimension of the bus bar example of FIG. 8.

Just a word to mention that the example of FIGS. 8 and 9 makes use of no folding or crimping of the peripheries of the lower 2 and upper 8 ground plates.

Of course, the insulating films 3, 5 and 7 can be rectangular with no cut therein.

Figure 1:
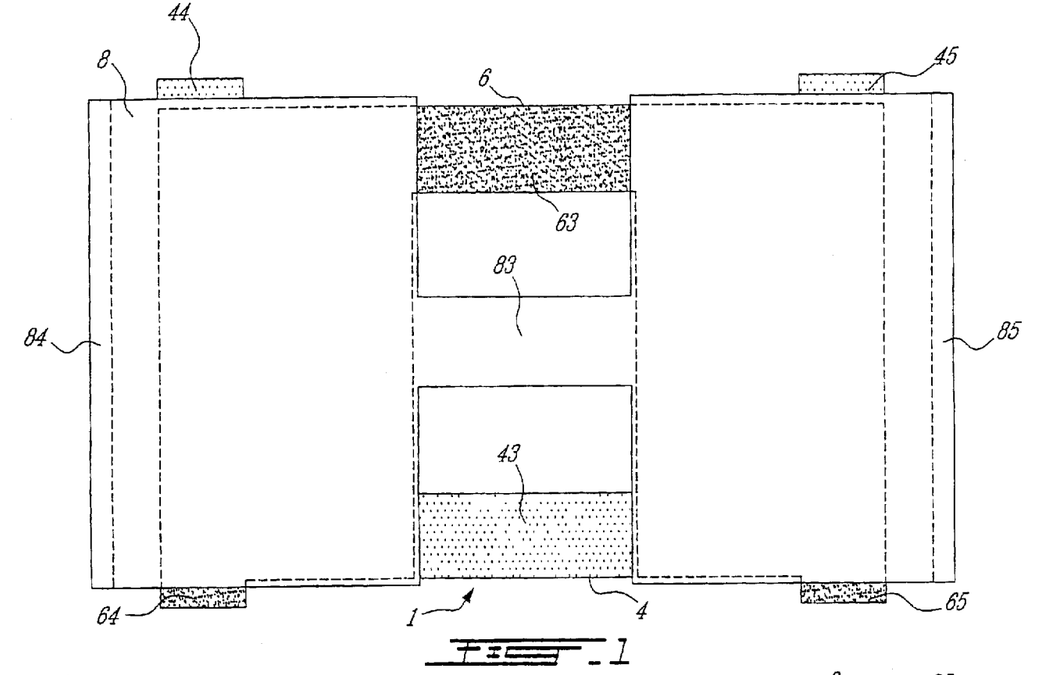
FIG. 1 is a top plan view of the preferred embodiment of the bus bar according to the present invention, having frequency-filtering features.

When the lower ground plate 2, the film 3, the positive plate 4, the film 5, the negative plate 6, the film 7 and the upper ground plate 8 are laminated, the bus bar geometry of FIGS. 1 and 2 (or FIGS. 8 and 9) results. More specifically, this bus bar geometry defines a filter having characteristics suitable to filter electromagnetic noise at given frequencies, for example frequencies above a desired cut-off frequency.

Figure 7:
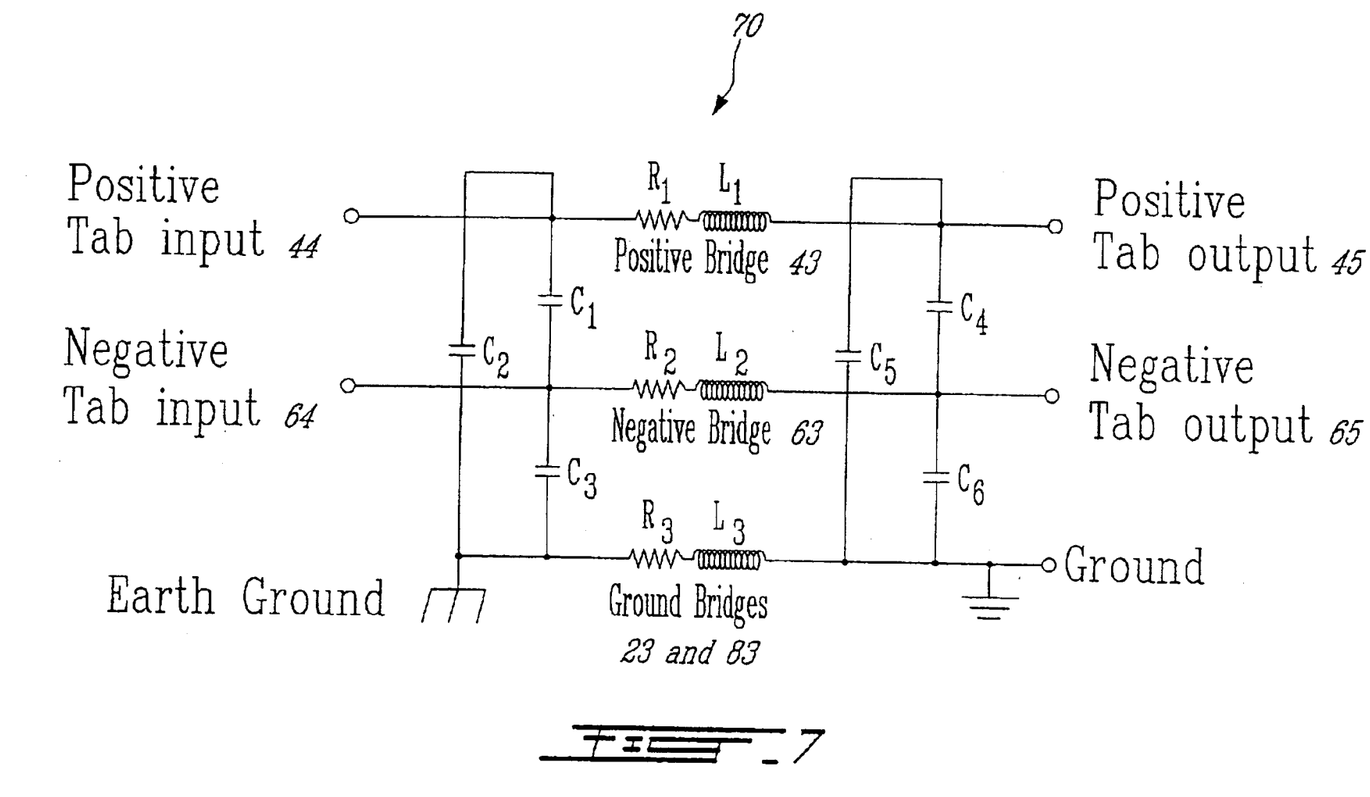
FIG. 7 is an equivalent circuit of the bus bar of FIGS. 1 and 2.

More specifically, the desired frequency-filtering response is obtained by manipulating the geometry of the plates 2, 4, 6 and 8 of the bus bar 1. As illustrated in FIG. 7, which is the equivalent circuit model 70 of the bus bar 1, the manipulated geometry defines a capacitive-inductive-capacitive structure capable of attenuating signals conducted through the input-to-output path of the bus bar 1 and having the above mentioned given frequencies, for example higher than the above mentioned desired cut-off frequency. Appropriate manipulation of the geometry of the plates 2, 4, 6, and 8 makes the bus bar 1 capable of attenuating signals down to levels that allow acceptable system performance.

Just a word to mention that, in the preferred embodiment, the end portions 21 and 81 of the outer lower 2 and upper 8 ground plates are earth grounded while the end portions 22 and 82 of the same ground plates are grounded. The positive 4 and negative 6 plates are used to distribute DC (Direct Current) electric power.

In the equivalent circuit model 70 of FIG. 7:

$C_1$ is a capacitance induced by the laminated shunt capacitor structure formed of (a) the end portion 41 of the positive plate 4, (b) the electrically insulating film 5, and (c) the end portion 61 of the negative plate 6;

$C_2$ is a capacitance induced by the laminated shunt capacitor structure formed of (a) the end portion 41 of the positive plate 4, (b) the electrically insulating film 3, and (c) the end portion 21 of the lower ground plate 2;

$C_3$ is a capacitance induced by the laminated shunt capacitor structure formed of (a) the end portion 61 of the negative plate 6, (b) the electrically insulating film 7, and (c) the end portion 81 of the upper ground plate 8;

$R_1$ and $L_1$ are resistance and inductance, respectively, induced by the bridge 43 of the positive plate 4 forming a first inductor structure;

$R_2$ and $L_2$ are resistance and inductance, respectively, induced by the bridge 63 of the negative plate 6 forming a second inductor structure;

$R_3$ and $L_3$ are resistance and inductance, respectively, induced by the bridges 23 and 83 of the lower 2 and upper 8 ground plates forming a third inductor structure;

$C_4$ is a capacitance induced by the laminated shunt capacitor structure formed of (a) the end portion 42 of the positive plate 4, (b) the electrically insulating film 5, and (c) the end portion 62 of the negative plate 6;

$C_5$ is a capacitance induced by the laminated shunt capacitor structure formed of (a) the end portion 42 of the positive plate 4, (b) the electrically insulating film 3, and (c) the end portion 22 of the lower ground plate 2; and $C_6$ is a capacitance induced by the laminated shunt capacitor structure formed of (a) the end portion 62 of the negative plate 6, (b) the electrically insulating film 7, and (c) the end portion 82 of the upper ground plate 8.

Frequency filtering is achieved by the built-in capacitances $C_1$, $C_2$, $C_3$, $C_4$, $C_5$ and $C_6$, inductances $L_1$, $L_2$ and $L_3$, and resistances $R_1$, $R_2$ and $R_3$ inherent to the structure and geometry of the bus bar 1. Those of ordinary skill in the art will appreciate that, by adjusting the areas of the end portions 21, 22, 41, 42, 61, 62, 81 and 82, changing the dielectric constant of the material of the films 3, 5 and 7, tuning the length and width of the bridges 23, 43, 63 and 83, and making the four bridges 23, 43, 63 and 83 more inductive by placing ferrite or another magnetic material around each bridge, one can tune the frequency-filtering characteristic of the bus bar 1 through adjustment of the values of the built-in capacitances $C_1$, $C_2$, $C_3$, $C_4$, $C_5$ and $C_6$, inductances $L_1$, $L_2$ and $L_3$, and resistances $R_1$, $R_2$ and $R_3$.

The present invention is suitable to cancel high frequency noise as well as voltage transients like surges from passing from the "raw" DC power supply to the DC power distribution within for example, a computer cabinet or chassis. However, an application to 60 Hz AC filtering should not be ignored; the filtering bus bar would then be simply used in a slightly different manner such as creating a narrow band pass filter around a 60 Hz central frequency by appropriately adjusting the geometry of the plates 2, 4, 6 and 8.

FIGS. 8 and 9 show an example of the dimensions (in inches) for the lower ground plate 2, the positive plate 4, the negative plate 6 and the upper ground plate 8, including the dimensions of end portions 21, 41, 61 and 81, end portions 22, 42, 62 and 82, and bridges 23, 43, 63 and 83. With this 4-conductor/3-insulator DC bus bar of FIGS. 8 and 9, an attenuation as high as 50 dB was obtained over a 3-dB cut-off frequency of 600 kHz.

Although the present invention has been described hereinabove by way of preferred embodiments thereof, it can be modified at will within the scope of the appended claims, without departing from the spirit and nature of the subject invention.

As non limitative examples of such modifications, the bus bar may comprise one or many pairs of conductor plates, the conductor plates can present shapes other than rectangular, and the conductor plates and electrically insulating films do not need to be planar.

What is claimed is:

1. A laminated conductor assembly comprising:

an input section;

an output section;

a superposition of alternate electrically conducting and electrically insulating layers; the superposition comprising:

a first electrically conducting ground plate;

an electrically conducting positive plate;

an electrically conducting negative plate;

electrical insulation interposed between the first ground plate and the positive plate, and between the positive plate and the negative plate, wherein the first ground plate, the positive plate and the negative plate are electrically insulated from one another;

wherein:

the plates present a geometry which defines both capacitive and inductive structures merely by the geometry of the plates without additional electrical components coupled between the plates; and the capacitive and inductive structures form, between said input and output sections, a capacitive and inductive frequency-filtering circuit.

2. A laminated conductor assembly as defined in claim 1, wherein each electrically conducting layer comprises:

a first wider end portion forming part of a first capacitive structure;

a second wider end portion opposite to the first wider end portion and forming part of a second capacitive structure; and a narrower bridge portion interconnecting the first and second wider end portions and defining an inductive structure.

3. A laminated conductor assembly as defined in claim 1, wherein the electrically conducting layers comprise:

respective, superposed first end portions for defining first capacitive structures;

respective, superposed second end portions opposite to the first end portions for defining second capacitive structures; and respective narrower bridge portions for interconnecting the first and second end portions of the corresponding electrically conducting layers, said narrower bridge portions defining respective inductive structures.

4. A laminated conductor assembly as recited in claim 3, wherein at least a part of said narrower bridge portions are laterally offset with respect to each other.

5. A laminated conductor assembly as defined in claim 3, wherein:

said first end portions comprise said input section; and;

said second end portions comprises said output section.

6. A laminated direct current bus bar, comprising:

an input section;

an output section;

a superposition of alternate electrically conducting plates and electrically insulating films; said superposition comprising:

a first electrically conducting ground plate;

an electrically conducting positive plate;

an electrically conducting negative plate;

a second electrically conducting ground plate;

a first electrically insulating film interposed between the first ground plate and the positive plate;

a second electrically insulating film interposed between the positive plate and the negative plate; and a third electrically insulating film interposed between the negative plate and the second ground plate;

wherein:

the first ground plate, the positive plate, the negative plate and the second ground plate each have a geometry which combine to form both capacitive and inductive structures merely by the geometry of the plates, the insulation and without additional electrical components coupled between the plates; and the capacitive and inductive structures form, between said input and output sections; a capacitive and inductive frequency-filtering circuit.

7. A laminated bus bar as defined in claim 6, wherein the first ground plate, the positive plate, the negative plate and the second ground plate are generally rectangular and each comprise:
 a first full-width end portion forming part of a first capacitive structure;
 a second full-width end portion opposite to the first full-width end portion and forming part of a second capacitive structure; and
 a narrower bridge portion interconnecting the first and second full-width end portions and defining an inductive structure.

8. A laminated bus bar as defined in claim 6, wherein the first and second ground plates both have first and second ends are longer than the positive and negative plates and the first, second and third films, and wherein the first ends of the first and second ground plates are interconnected and the second ends of the first and second ground plates are interconnected.

9. A laminated bus bar comprising:
 an input section;
 an output section;
 a superposition of alternate electrically conducting plates and electrically insulating films; said superposition comprising:
  a first electrically conducting ground plate;
  an electrically conducting positive plate;
  an electrically conducting negative plate;
  a second electrically conducting ground plate;
  a first electrically insulating film interposed between the first ground plate and the positive plate;
  a second electrically insulating film interposed between the positive plate and the negative plate; and
  a third electrically insulating film interposed between the negative plate and the second ground plate;
 wherein:
  the first ground plate, the positive plate, the negative plate and the second ground plate have a geometry which defines both capacitive and inductive structures; and
  the capacitive and inductive structures form, between said input and output sections; a capacitive and inductive frequency-filtering circuit,
  wherein the first ground plate, the positive plate, the negative plate and the second ground plate comprise:
   respective, superposed first end portions for defining first capacitive structures;
   respective, superposed second end portions opposite to the first end portions for defining second capacitive structures; and
   respective narrower bridge portions for interconnecting the first and second end portions of the corresponding plates, said narrower bridge portions defining respective inductive structures.

10. A laminated bus bar as recited in claim 9, wherein the narrower bridge portions of the positive and negative plates are laterally offset with respect to each other and with respect to the narrower bridge portions of the first and second ground plates.

11. A laminated bus bar as defined in claim 9, wherein:
 the first end portions of the positive and negative plates comprise said input section; and the second end portions of the positive and negative plates comprise said output section.

12. A laminated bus bar as recited in claim 11, wherein:
 the input section comprises a tab on the first end portion of the positive plate and a tab on the first end portion of the negative plate; and
 the output section comprises a tab on the second end portion of the positive plate and a tab on the second end portion of the negative plate.

13. A laminated bus bar as recited in claim 12, wherein:
 the first ground plate, the positive plate, the negative plate and the second ground plate have respective first and second ends;
 the tab of the first end portion of the positive plate is a laterally extending tab situated at said first end of the positive plate;
 the tab of the first end portion of the negative plate is a laterally extending tab situated at said first end of the negative plate;
 the tab of the second end portion of the positive plate is a laterally extending tab situated at said second end of the positive plate; and
 the tab of the second end portion of the negative plate is a laterally extending tab situated at said second end of the negative plate.

14. A laminated bus bar as recited in claim 9, wherein:
 the first and second ground plates are electrically interconnected;
 the first end portion of the positive plate and the first end portion of the first ground plate define with the first film a first shunt capacitor structure;
 the first end portion of the positive plate and the first end portion of the negative plate define with the second film a second shunt capacitor structure;
 the first end portion of the negative plate and the first end portion of the second ground plate define with the third film a third shunt capacitor structure;
 the narrower bridge portion of the positive plate forms a first inductor structure;
 the narrower bridge portion of the negative plate forms a second inductor structure;
 the narrower bridge portions of the first and second ground plates form a third inductor structure;
 the second end portion of the positive plate and the second end portion of the first ground plate define with the first film a fourth shunt capacitor structure;
 the second end portion of the positive plate and the second end portion of the negative plate define with the second film a fifth shunt capacitor structure; and
 the second end portion of the negative plate and the second end portion of the second ground plate define with the third film a sixth shunt capacitor structure.

15. A laminated bus bar comprising:
 an input section;
 an output section;
 a superposition of alternate electrically conducting plates and electrically insulating films; said superposition comprising:
  a first electrically conducting ground plate having a narrower bridge portion;
  an electrically conducting positive plate having a narrower bridge portion;
  an electrically conducting negative plate having a narrower bridge portion;

a second electrically conducting ground plate having a narrower bridge portion;
a first electrically insulating film interposed between the first ground plate and the positive plate;
a second electrically insulating film interposed between the positive plate and the negative plate; and
a third electrically insulating film interposed between the negative plate and the second ground plate;

wherein:

the first ground plate, the positive plate, the negative plate and the second ground plate have a geometry which defines both capacitive and inductive structures; and the capacitive and inductive structures form, between said input and output sections; a capacitive and inductive frequency-filtering circuit, wherein:

the first ground plate, the positive plate, the negative plate and the second ground plate are generally rectangular;

the narrower bridge portion of the first ground plate is a longitudinal bridge portion located centrally of the first ground plate;

the narrower bridge portion of the second ground plate is a longitudinal bridge portion located centrally of the second ground plate;

the narrower bridge portion of the positive plate is a longitudinal bridge portion located on a first side of the positive plate; and the narrower bridge portion of the negative plate is a longitudinal bridge portion located on a second side of the negative plate opposite to said first side.

16. A laminated conductor assembly comprising:

an input section;

an output section;

a superposition of alternate electrically conducting and electrically insulating layers; the superposition comprising:
a first electrically conducting ground plate;
an electrically conducting positive plate;
an electrically conducting negative plate;
electrical insulation interposed between the first ground plate and the positive plate, and between the positive plate and the negative plate, wherein the first ground plate, the positive plate and the negative plate are electrically insulated from one another;

wherein:

the electrically conducting layers present a geometry which defines both capacitive and inductive structures; and the capacitive and inductive structures form, between said input and output sections, a capacitive and inductive frequency-filtering circuit, wherein:

the first ground plate, the positive plate and the negative plate each comprise a bridge portion located between two larger portions;

the bridge portion of the first ground plate is a longitudinal bridge portion located centrally of the first ground plate;

the bridge portion of the positive plate is a longitudinal bridge portion located on a first side of the positive plate; and the bridge portion of the negative plate is a longitudinal bridge portion located on a second side of the negative plate opposite to said first side.

17. A laminated direct current bus bar comprising:

an input section;

an output section;

a superposition of alternate electrically conducting plates and electrically insulating films; said superposition comprising:
a first electrically conducting ground plate;
an electrically conducting positive plate;
an electrically conducting negative plate;
a second electrically conducting ground plate;
a first electrically insulating film interposed between the first ground plate and the positive plate;
a second electrically insulating film interposed between the positive plate and the negative plate; and
a third electrically insulating film interposed between the negative plate and the second ground plate;

wherein:

the first ground plate, the positive plate, the negative plate and the second ground plate have a geometry which defines both capacitive and inductive structures; and the capacitive and inductive structures form, between said input and output sections; a capacitive and inductive frequency-filtering circuit, and wherein:

the first ground plate, the positive plate and the negative plate each comprise a bridge portion located between two larger portions;

the bridge portion of the first ground plate is a longitudinal bridge portion located centrally of the first ground plate;

the bridge portion of the positive plate is a longitudinal bridge portion located on a first side of the positive plate; and the bridge portion of the negative plate is a longitudinal bridge portion located on a second side of the negative plate opposite to said first side.

* * * * *